(12) United States Patent
Shaw (10) Patent No.: US 6,951,676 B2
(45) Date of Patent: Oct. 4, 2005

(54) BUTT SPLICING TAPES AND BUTT SPLICING METHODS

(75) Inventor: Robert G. Shaw, Venlo (NL)

(73) Assignee: 3M Innovative Properties Company, St. Paul, MN (US)

( * ) Notice: Subject to any disclaimer, the term of this patent is extended or adjusted under 35 U.S.C. 154(b) by 80 days.

(21) Appl. No.: 10/381,167

(22) PCT Filed: Aug. 29, 2001

(86) PCT No.: PCT/US01/26979

§ 371 (c)(1),
(2), (4) Date: Mar. 19, 2003

(87) PCT Pub. No.: WO02/26609

PCT Pub. Date: Apr. 4, 2002

(65) Prior Publication Data

US 2004/0076784 A1 Apr. 22, 2004

(30) Foreign Application Priority Data

Sep. 25, 2000 (EP) .............................. 00120845

(51) Int. Cl.⁷ ................................. B32B 3/00
(52) U.S. Cl. ................ 428/40.1; 156/502; 156/504; 156/507; 242/556; 242/556.1; 428/42.1; 428/57; 428/58
(58) Field of Search ............... 428/40.1, 57, 58, 428/42.1; 156/502, 504, 507; 242/556, 556.1

(56) References Cited

U.S. PATENT DOCUMENTS

| | | |
|---|---|---|
| 2,149,832 A | 3/1939 | Bernard |
| 2,149,833 A | 3/1939 | Bernard |
| 2,172,776 A | 9/1939 | Scott |
| 2,377,971 A | 6/1945 | Roesen |
| 2,920,835 A | 1/1960 | Gibson |
| 3,503,568 A | 3/1970 | Galley |
| 3,520,748 A | 7/1970 | Riegger |
| 3,547,739 A | 12/1970 | Beute |
| 4,264,401 A | 4/1981 | Ganz |
| 4,388,432 A | 6/1983 | Eskay |

(Continued)

FOREIGN PATENT DOCUMENTS

| | | |
|---|---|---|
| CA | 2025473 | 3/1991 |
| CA | 2212201 | 2/1998 |
| CA | 2277013 | 1/2000 |
| DE | 31 23 414 | 4/1982 |
| DE | 35 23 139 | 2/1987 |

(Continued)

OTHER PUBLICATIONS

"Acrylic Adhesives" Handbook of Pressure Sensitive Adhesive Technology, Second Edition, pp. 396–456 (D. Satas, editor); Van Nostrand Reinhold, New York.

*Primary Examiner*—Nasser Ahmad (57) ABSTRACT

Butt splicing tape comprising: a splicing portion, an attachment portion and a gripping portion, wherein said splicing portion comprises an elongated first backing member (10) having two faces and two longitudinal edges, a first adhesive layer (11') on the first face of said first backing member (10), said first adhesive layer (11') extending substantially along the first longitudinal edge of said first backing member (10) and optionally being covered by a first release liner (12), and a second adhesive layer (11") on the first face of said first backing member (10), said second adhesive layer (11") extending substantially along the second longitudinal edge of said first backing member (10) and being covered by a second release liner (13) having two faces and two longitudinal edges, the first face of said second releaser liner (13) being adjacent to second adhesive layer (11"); wherein said attachment portion (20, 21) is connected to said splicing portion, and includes a third adhesive layer (31) and is connected to said second release liner (13) of splicing portion.

18 Claims, 6 Drawing Sheets

U.S. PATENT DOCUMENTS

| | | | |
|---|---|---|---|
| 4,398,985 A | 8/1983 | Eagon | |
| 4,413,080 A | 11/1983 | Blake | |
| 4,482,675 A | 11/1984 | Witt | |
| 4,485,979 A | 12/1984 | Dropczynski | |
| 4,564,150 A | 1/1986 | Keene et al. | |
| 4,569,960 A | 2/1986 | Blake | |
| 4,575,017 A | 3/1986 | Pali | |
| 4,597,820 A | 7/1986 | Nozaka | |
| 4,746,076 A | 5/1988 | Tomma et al. | |
| 4,905,924 A | 3/1990 | Moore | |
| 5,032,460 A | 7/1991 | Kantner et al. | |
| 5,102,733 A | 4/1992 | Zawadzki | |
| 5,125,995 A | 6/1992 | D'Haese et al. | |
| 5,202,190 A | 4/1993 | Kantner et al. | |
| 5,212,002 A | 5/1993 | Madrzak et al. | |
| 5,275,344 A | 1/1994 | Ray | |
| 5,277,731 A | 1/1994 | Krimsky et al. | |
| 5,301,891 A | 4/1994 | Duguay | |
| 5,318,656 A | 6/1994 | Dylla et al. | |
| 5,322,230 A | 6/1994 | Dylla et al. | |
| 5,323,981 A | 6/1994 | Dionne | |
| 5,348,793 A | 9/1994 | Stettner | |
| 5,356,496 A | 10/1994 | Lincoln et al. | |
| 5,380,779 A | 1/1995 | D'Haese | |
| 5,397,076 A | 3/1995 | Padilla | |
| 5,524,844 A | 6/1996 | McCormick et al. | |
| 5,692,699 A | 12/1997 | Weirauch et al. | |
| 5,732,902 A | 3/1998 | Tomma et al. | |
| 5,901,919 A | 5/1999 | Wienberg | |
| 5,916,651 A | 6/1999 | Wienberg et al. | |
| 5,996,927 A | 12/1999 | Weirauch et al. | |
| 6,416,604 B1 | 7/2002 | Nootbaar et al. | |

FOREIGN PATENT DOCUMENTS

| | | |
|---|---|---|
| DE | 40 33 900 A1 | 10/1991 |
| DE | 92 01 286.8 | 6/1992 |
| DE | 92 15 731.9 | 4/1993 |
| DE | 42 10 329 A1 | 10/1993 |
| DE | 196 32 689 A1 | 2/1998 |
| DE | 19841609 A1 | 3/2000 |
| DE | 296 24 000 | 8/2001 |
| EP | 0 418 527 A2 | 3/1991 |
| EP | 0 555 772 A1 | 8/1993 |
| EP | 0 566 880 A1 | 10/1993 |
| EP | 0 618 509 B1 | 10/1994 |
| EP | 0 818 408 A1 | 1/1998 |
| EP | 0 941 954 A1 | 9/1999 |
| EP | 0 970 904 A1 | 1/2000 |
| EP | 0 970 905 A1 | 1/2000 |
| GB | 1 220 882 | 1/1971 |
| GB | 2 294 235 A | 4/1996 |
| JP | 10-88088 | 4/1998 |
| WO | WO 90/08032 | 7/1990 |
| WO | WO 91/08159 | 6/1991 |
| WO | WO 94/25380 | 11/1994 |
| WO | WO 94/25381 | 11/1994 |
| WO | WO 95/29115 | 11/1995 |
| WO | WO 99/55608 | 11/1999 |

BUTT SPLICING TAPES AND BUTT SPLICING METHODS

TECHNICAL FIELD

The present invention relates to butt splices between sheet materials, a splicing tape for use in producing such splices and methods of producing butt splices.

BACKGROUND TO THE INVENTION

Figure 1:
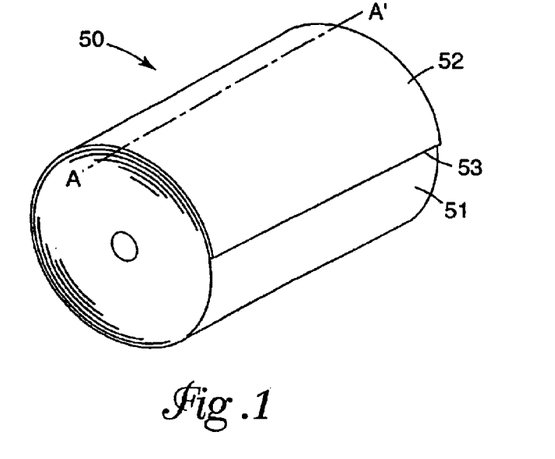
FIG. 1 shows a roll of sheet material.

In this application and merely for clarity purposes, the leading end and edge of sheet material on a roll is considered to be the last quadrant of sheet material exposed on the outside of the roll, i.e. the section 52 of sheet material shown in FIG. 1 from the imaginary line A–A' to the edge 53. The underlying winding of such a roll is then the piece of sheet material on which the leading edge 52 rests from A–A' through 360° to A–A' again.

Joining of the leading edge of one roll or part roll to the trailing edge of a further roll or part roll is typically accomplished by either permanent or flying splicing. The permanent splice should provide a flexible strong connection between the two webs and should maintain substantially all of the properties of the sheet material. For example if the sheet material is paper which can be printed or coated, the permanent splice is preferably thin, flexible, printable, coatable and should also have the same repulpable properties of paper. Flying splices are usually temporary splices made at machine running speed between rolls when it is undesirable to stop the machine, e.g. during coating or printing.

Two common types of splices are known for webs of sheet materials, overlap and butt splices.

Figure 2A:
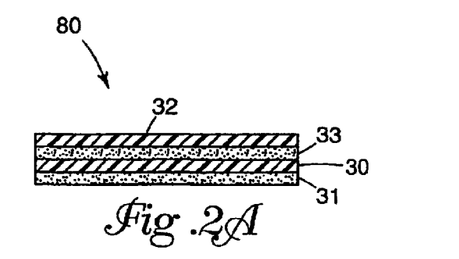
FIGS. 2A and B show typical double-sided adhdesive tapes used for overlap splicing.
Figure 2B:
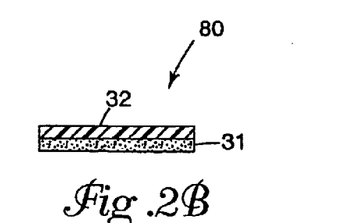

For an overlap splice, the leading and trailing edges of the first and second rolls of sheet material are typically joined together by a double-sided adhesive tape as shown in FIG. 2A or B. The double-sided adhesive tape is either a double-coated adhesive tape having a backing member 30 and an adhesive layer 31 and 33 on each side (FIG. 2A) or a transfer tape with a single adhesive layer 31 (FIG. 2B). Such tapes are typically supplied with a single release liner 32. An overlap splice has a disadvantage that there is a considerable step at the change from the first to second sheet material which can disrupt the printing process. Further there is the possibility of the adhesive bleeding out of the splice, which could then adhere layers of sheet material together or damage or obstruct printing machinery.

Figure 3:
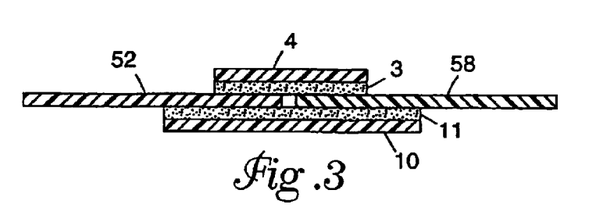
FIG. 3 shows a typical permanent butt splice
Figure 4:
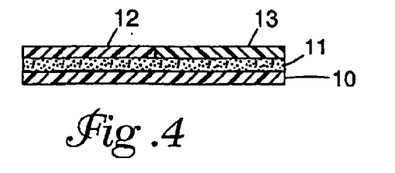
FIG. 4 shows the butt splicing tape described in WO 90/08032.

A typical permanent butt splice is shown in FIG. 3. Here the leading edge of sheet material from one roll 52 and the trailing edge of a further roll 58 are attached to an adhesive layer 11 on a backing 10, and then the splice is covered with a covering adhesive tape 3,4. Such a splice can be made using a splicing tape as shown in FIG. 4 with a single adhesive surface 11 covered with a removable protective film comprising two longitudinal parts 12 and 13 which can be separately removed from the adhesive surface, i.e. a "split release liner". The butt splice reveals a low profile step, and the possibility of adhesive bleeding is minimal because the butt splice has no exposed adhesive portions. Although the butt splice would be preferred for both and permanent and flying splicing due to above-mentioned advantages, several disadvantages with the application of the tape of the kind shown in FIG. 4 have resulted in this tape not being widely used for permanent or flying splicing. First, the tape must be stretched across the width of a roll, which may be 4 to 10 meters wide with the non-adhesive side of the backing adjacent to the roll. This is usually accomplished by two or more operators, who provisionally place the tape into its final position on the roll using small pieces of adhesive tape. Such a procedure suffers from a number of disadvantages, for example inter alia it is worker-intensive and time-consuming and there is the possibility that the small pieces of tape are inadvertently not removed after application of the tape.

Figure 5:
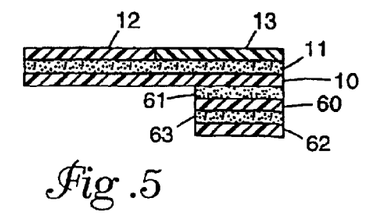
FIG. 5 shows the butt splicing tape proposed in DE-A-4033900.

In U.S. Pat. No. 5,212,002, a modified flying butt splice tape is proposed as shown in FIG. 5. The proposed tape consists of a substrate 10, e.g. backing, with an adhesive layer 11 with a split cover liner (12 and 13) on one side and on the opposite at least one narrow adhesive strip 60, 61, 63. After splicing, this splice tape leaves the adhesive strip 60, 61, 63 and thus an exposed surface of adhesive 61 on the underlying winding of the first roll at a distance of approximately one circumference of this roll from the actual splice. This exposed adhesive layer is capable of picking up sheet remnants or attaching itself to other objects or parts of machinery which can disrupt smooth operation, in particular machine printing.

Figure 6A:
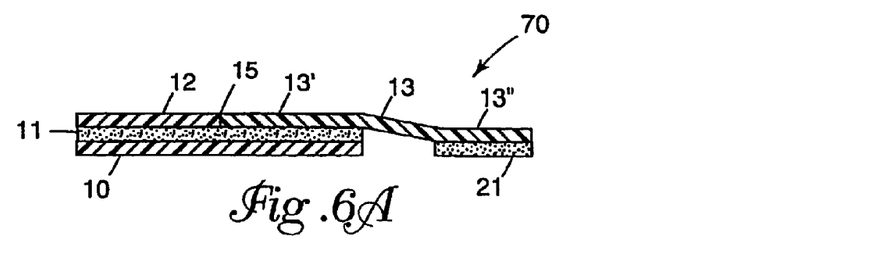
FIGS. 6A and 6B show a general type of butt splicing tapes disclosed in WO 94/25380 and WO 95/29115.
Figure 6B:
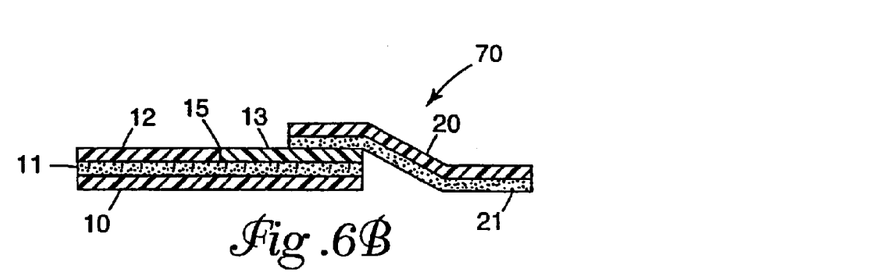

To overcome the above-mentioned disadvantages, WO 94/25380 and WO 95/29115 propose a number of splicing tapes. One general type of proposed tape is shown in FIGS. 6A and B. Said tapes include a splicing portion comprising a backing 10 with an adhesive layer 11 on one side covered with at least one release liner 12, 13 and an attachment portion 21 or 20, 21, which is connected to and distributed along the splicing portion. The attachment portion allows for a releasable and self-supportive attachment of the splicing portion to the outer surface of the underlying winding of the roll of sheet material across the width of the roll. Also, the attachment portion is adapted for releasing at least the splicing portion from the underlying winding of the roll while leaving the outer surface of the underlying winding in a substantially non-tacky condition. The proposed tapes offer a number of advantages. The tape can be placed on the roll of sheet material by a single operator and may be repositionable. Also after splicing substantially no exposed adhesive remains on the outer surface of the underlying wind of the roll.

WO 94/25380 and WO 95/29115 also disclose a method for preparing a splice using the splicing tapes shown in FIGS. 6A and B. In the disclosed method, the splicing tape is attached to the outer surface of the underlying winding using the attachment portion substantially across the width of the roll. The first part of the adhesive layer is exposed by removing the first release liner 12 and then the leading edge is attached to the exposed adhesive layer. The attachment of the leading edge is typically accomplished by pressing the leading edge against the exposed adhesive by hand. Any excess of the leading edge extending over the second release liner of the second part of adhesive layer is folded back, creased and torn off, as is usual in the paper industry, at the transition between first and second release liner. Subsequently, the second part of the adhesive layer is exposed by removing the second release liner 13 manually, which means that the attachment portion comes away from the underlying winding as well as the splicing portion attached to the leading edge. Thereafter, the further end (e.g. the trailing edge) of a second web of sheet material can be fixed in a similar manner on the exposed part of the adhesive layer. Alternatively the roll can be rotated to simplify the application of the further end of second sheet material. For example the further end can be fixed on the exposed adhesive layer as the splicing tape with the exposed adhesive layer rotates through and catches the second sheet material drawn over a guide roller or drum from the web supply.

Again any excess of the further end can be subsequently torn off to the correct length in order to form a neat butt splice.

The fixing of the further end of the second web of sheet material to the exposed adhesive layer by hand may be disadvantageous in that it sometimes may be difficult to maintain the proper tension of the roll during said attachment. This is especially true because the tension of the second web is often temporarily released in order to bring further end of said web into position for fixing. The alternative method of rotating the splicing tape with the exposed adhesive layer through to catch the further end of the second web of sheet material can also be disadvantageous, in particular for splicing performed on winders or rewinders having a rider-means. Upon rotation of the roll with the attached splicing tape, the exposed adhesive layer passes over the rider-means. The exposed adhesive layer can pick up dirt, web remnants or the like present on the rider-means.

The term "rider-means" as used above and below is to be understood here as any relatively horizontal means riding on the roll of the web, such as a supporting drum or belt-support or a conventional rider roll. For example, the winder/rewinder available from Valmet Corporation, Helsinki, Finland under the trademark WinDrum L Winder has a supporting drum as a rider-means. Winders/rewinders having a drum as a rider-means are also for example described in U.S. Pat. No. 4,485,979. The winder/rewinders available from Valmet under the trademarks Winbelt Winder, WinRoll Winder and JR 1000 E Winder are examples of winder/rewinders having a belt-support as a rider-means. Winders comprising a belt-support are also for example described in WO 99/55608, U.S. Pat. No. 4,746,076 and U.S. Pat. No. 5,732,902.

SUMMARY OF THE INVENTION

Thus, it is desirable to provide butt splicing tapes and methods of butt splicing which overcome the above-mentioned disadvantages, while maintaining advantageous aspects of splicing tapes shown in FIGS. 6A and B and methods of preparing and making a splice with such splicing tapes.

The present invention provides a butt splicing tape comprising:

a splicing portion, an attachment portion and a gripping portion, wherein said splicing portion comprises
an elongated first backing member having two faces and two longitudinal edges,
a first adhesive layer on the first face of said first backing member, said first adhesive layer extending across the width of said first backing member substantially along the first longitudinal edge of said first backing member and optionally being covered by a first release liner, and
a second adhesive layer on the first face of said first backing member, said second adhesive layer extending across the width of said first backing member substantially along the second longitudinal edge of said first backing member and being covered by a second release liner having two faces and two longitudinal edges, the first face of said second releaser liner being adjacent to second adhesive layer;
wherein said attachment portion is connected to and distributed substantially along said splicing portion, said attachment portion including a third adhesive layer; and
wherein said gripping portion includes a fourth adhesive layer and is connected to and distributed substantially along said second release liner of splicing portion.

The present invention also provides a prepared splice on the leading edge of a roll of sheet material, each winding of said sheet material on said roll having an outer surface facing radially outwards from said roll and said roll having an underlying winding, comprising:

a splicing portion, an attachment portion and a gripping portion, wherein said splicing portion comprises
an elongated first backing member having two faces and two longitudinal edges,
a first adhesive layer on the first face of said first backing member attaching the leading edge of the roll substantially across the width of said roll to said first backing member, said first adhesive layer extending across the width of said first backing member substantially along the first longitudinal edge, and
a second adhesive layer on the first face of said first backing member, said second adhesive layer extending across the width of said first backing member substantially along the second longitudinal edge of said first backing member and being covered by a second release liner having two faces and two longitudinal edges, the first face of said second release liner being adjacent to second adhesive layer;
wherein said attachment portion is connected to and distributed substantially along said splicing portion and releasably and self-supportively attaching said splice to the outer surface of the underlying winding of said roll substantially across the width of said roll, said attachment portion including a third adhesive layer; and
wherein said gripping portion includes a fourth adhesive layer and is connected to and distributed substantially along said second release liner.

The present invention further provides a method for preparing a splice on the leading edge of a roll of sheet material using a butt splicing tape according to the invention, each winding of said sheet material on said roll having an outer surface facing radially outwards away from said roll and said roll having an underlying winding, said method comprising the following steps:

attaching said splicing tape to the outer surface of said underlying winding using the third adhesive layer substantially across the width of the said roll; and
attaching said leading edge to the first adhesive layer.

In addition the invention provides a method for making a butt splice on winder or rewinder having a rider means between the leading edge of a roll of sheet material and a further sheet material using a butt splicing tape according to the invention, each winding of said sheet material on said roll having an outer surface facing radially outwards away from said roll and said roll having an underlying winding, said method comprising the following steps:

attaching said splicing tape to the outer surface of said underlying winding using the third adhesive layer substantially across the width of the said roll;
attaching the said leading edge to the first adhesive layer; and
rotating said roll of sheet material, so that the gripping portion grips onto the rider means, whereby the attachment portion is removed from the outer surface of the underlying winding and the second release liner is removed to expose the second adhesive layer, and so that the further sheet material is attached to the exposed second adhesive layer.

The methods for preparing a butt splice or making a butt splice according to the invention can also be advantageously adapted so that they can be performed using two separate tapes, instead of a single composite tape. One tape can be a splicing tape comprising a splicing portion and an attachment portion, such as the known splicing tapes shown in FIGS. 6A and B. The second tape can be a double-sided adhesive tape, for example a double-coated adhesive tape or a transfer tape as shown in FIG. 2A or B.

Thus in another aspect of the present invention there is provided a method of preparing a splice on the leading edge of a roll of sheet material using a splicing tape and a double-sided adhesive tape, each winding of said sheet material on said roll having an outer surface facing radially outwards away from said roll and said roll having an underlying winding, said splicing tape comprising a splicing portion and an attachment portion, wherein said splicing portion comprises an elongated backing member having two faces and two longitudinal edges, a first adhesive layer on the first face of said backing member, said first adhesive layer extending across the width of said backing member substantially along the first longitudinal edge of said backing member and optionally being covered by a first release liner, and a second adhesive layer on the first face of said backing member, said second adhesive layer extending across the width of said backing member substantially along the second longitudinal edge of said backing member and being covered by a second release liner having two faces and two longitudinal edges, the first face of said second release liner being adjacent to second adhesive layer; and wherein said attachment portion is connected to and distributed substantially along said splicing portion, said attachment portion including a third adhesive layer, said method comprising the following steps:
(i) attaching said splicing tape to the outer surface of the underlying winding using said third adhesive layer substantially across the width of the roll;
(ii) attaching said leading edge to the first adhesive layer; and
(iii) attaching said double-sided adhesive tape to said splicing tape such that one side of said double-sided adhesive tape is connected to and substantially distributed along said second release liner of said splicing tape extending across the width of second release liner from substantially the first longitudinal edge of the second release liner and extending towards second longitudinal edge of the second release liner; the second side of said double-sided adhesive tape is optionally covered with a release liner.

Further, in an additional aspect of the invention, there is a method of making a butt splice on a winder or rewinder having a rider means between the leading edge of a roll of sheet material and a further sheet material using a splicing tape and a double-sided adhesive tape, each winding of said sheet material on said roll having an outer surface facing radially outwards away from said roll and said roll having an underlying winding, said splicing tape comprising a splicing portion and an attachment portion, wherein said splicing portion comprises an elongated backing member having two faces and two longitudinal edges, a first adhesive layer on the first face of said backing member, said first adhesive layer extending across the width of said backing member substantially along the first longitudinal edge of said backing member and optionally being covered by a first release liner, and a second adhesive layer on the first face of said backing member, said second adhesive layer extending across the width of said backing member substantially along the second longitudinal edge of said backing member and being covered by a second release liner having two faces and two longitudinal edges, the first face of said second release liner being adjacent to second adhesive layer; and wherein said attachment portion is connected to and distributed substantially along said splicing portion, said attachment portion including a third adhesive layer, said method comprising the following steps:
(i) attaching said splicing tape to the outer surface of the underlying winding using said third adhesive layer substantially across the width of the roll;
(ii) attaching said leading edge to the first adhesive layer;
(iii) attaching said double-sided adhesive tape to said splicing tape such that one side of said double-sided adhesive tape is connected to and substantially distributed along said second release liner of said splicing tape extending across the width of second release liner from substantially the first longitudinal edge of the second release liner and extending towards second longitudinal edge of the second release liner; the second side of said double-sided adhesive tape is optionally covered with a release liner;
(iv) removing the release liner from the second side of the double-sided adhesive tape, if present, to expose the underlying adhesive layer; and
(v) rotating said roll of sheet material, so that the double-sided adhesive tape grips onto the rider means, whereby the attachment portion of said splicing tape is removed from the outer surface of the underlying winding and the second release liner is removed to expose the second adhesive layer, and so that the further sheet material is attached to the exposed second adhesive layer.

The use of the butt splicing tapes of the invention as well as the methods of preparing a splice and making a butt splice according to the invention overcomes disadvantages associated with the butt splicing tapes and butt splicing methods known in the art. In particular, the attachment of the further end of a second web of sheet material can be achieved without releasing the tension of the feed of the further web of sheet material, and thus the proper tension of the roll is maintained throughout said attachment. Also the attachment of the further sheet material can be accomplished upon rotation of the roll with the attached splicing tape passing any machinery, e.g. a rider means, without incorporating dirt, web remnants or the like in the final splice or attachment of the actual splicing portion on machinery, e.g. a rider-means.

The butt splicing tapes of the invention and the methods of preparing a splice and making a butt splice according to the invention find particularly advantageous use for splicing on a winder or rewinder having a rider means, in particular such winders or rewinders also having a guide means. Under the term "guide means" is to be understood a guide roller, drum, winder drum or the like over which the second web of sheet material is drawn from a web supply.

The dependent claims define further embodiments of the invention.

The invention, its embodiments and further advantages will be described in the following with reference to the following drawings.

DETAILED DESCRIPTION

In the following description the same reference signs are used for similar components of the splicing tapes throughout the figures. It should be noted that the thickness of adhesive layers, liners and backing members has been exaggerated in the figures for clarity purposes. Also merely for the purposes of clarity the backing member of the splicing portion of the splicing tapes will be referred to as the first backing member, while backing members of the attachment portion and the gripping portion of the splicing tapes, if present, will be referred to as the second and third backing member, respectively.

In all embodiments of the butt splicing tapes and prepared splices according to the invention, the splicing portion comprises an elongated first backing member with a first adhesive layer on the one face of the first backing member and a second, adhesive layer on the same face of the first backing member. The second face of the first backing member is preferably free of any adhesive layer. The first adhesive layer extends across the width of the first backing member substantially along the first longitudinal edge. The first adhesive layer is used for the attachment of the leading edge of the roll substantially across the width of the roll to first backing member. The first adhesive layer may optionally be covered by a first release liner. The second adhesive layer extends across the width of the first backing member substantially along the second longitudinal edge. The second adhesive is used for the attachment of the first backing member to the further sheet material. The second adhesive layer is covered by a second release liner.

The first backing member is typically similar in strength and flexibility of the sheet materials to be joined and may be plastic or paper or any similar sheet material. When paper sheets are to be joined, it is preferable that the material of the first backing as well as all other materials which remain in the completed splice are repulpable and/or water soluble and/or water dispersible. The thickness of the first backing member is typically in the range 30 to 250 µm and the width is typically 30 to 100 mm. The surface of the first backing member should preferably be coatable and/or printable. Suitable materials may include super calendered (glassine) or semi-bleached Kraft paper.

The first and second adhesive layers may be applied such that a continuous adhesive layer is formed over the width of the first backing member or there may be two separate strips of adhesive layer with a gap there between. The first and/or second adhesive layer is preferably a pressure sensitive adhesive (PSA) layer. Suitable PSA for the first or second adhesive layer include an adhesive of the acrylic, natural or synthetic rubber-based, silicone type or similar types. A repulpable adhesive is preferable. A repulpable acrylic adhesive is particularly preferred. The thickness of the first and/or second adhesive layer may typically be 2 to 100 µm.

The release liners may be a single release liner with a slit, a longitudinal weakness or a perforation in the middle thereof. The release liners may also be two separate release liners adjacent to each other. The release liners may be of any suitable conventional kind of release liner known in the art, e.g. silicon or waxed papers with a typical thickness of 30 to 150 µm.

In all embodiments of the butt splicing tapes and prepared splices according to the invention, the attachment portion is connected to and distributed substantially along the splicing portion and comprises an adhesive layer, the "third adhesive layer". The attachment portion is used to temporarily attach the splicing tape to the roll of sheet material, e.g. on the outer surface of the underlying winding of the roll. The attachment portion of the splicing tape is sufficient in that the splicing tape is self-supporting on the roll, i.e. when applied in a straight line it is capable of supporting its own weight without sagging or pulling. The third adhesive layer of the attachment portion is used to leave the outer surface of the underlying winding of the roll in a substantially non-tacky condition upon release.

The third adhesive layer may be a weakly adhering adhesive layer. The third adhesive layer may be a repositionable adhesive layer made from any known repositionable adhesive. For the purposes of this invention, a repositionable adhesive has a property of adhering to and being removable from a substrate surface without transfer of substantial quantities of adhesive material to the substrate surface. Further, it is preferable that the adhesive layer substantially retains, after removal, its adhesive properties so that it may be reapplied to the same substrate surface. A repositionable adhesive usually has a peel strength to the substrate surface lower than that for a conventional aggressively tacking PSA. In particular, it is preferable that the removal of the repositionable adhesive layer from a paper substrate does not damage the surface fibers of the paper. Suitable repositionable adhesive include the adhesive types used on the memostickers of the Post-It brand, on Correction and Cover-up Tape 658 brand, on Scotch Masking Tape 1104 brand, all made by Minnesota Mining and Manufacturing Company, St. Paul, Minn., USA. The thickness of the third adhesive layer may typically be 2 to 100 µm.

In certain embodiments of the butt splicing tapes and prepared splices according to the invention, the attachment portion may further comprise a second backing member. Second backing member may be any suitable backing material and is not necessarily repulpable, water soluble or water dispersible as this backing member does not become part of the final splice. It is however, preferable, if all materials used in the splicing tapes in accordance with the invention are repulpable. Suitable materials for the second backing member may include crepe papers or Kraft paper. The second backing member is typically 15 to 50 mm wide and 30 to 250 µm thick.

In all embodiments of the butt splicing tapes and prepared splices according to the invention, the gripping portion comprises an adhesive layer, "fourth adhesive layer" and is connected to and distributed substantially along the second release liner of the splicing portion. The fourth adhesive layer may optionally be covered by a release liner, which would be removed prior to making the splice. The material of the release liner may be similar to those described with respect to the release liners of the splicing portion.

In certain embodiments of the butt splicing tapes and prepared splices according to the invention, the gripping portion may be connected to and distributed substantially along both the second release liner of the splicing portion and the attachment portion.

The gripping portion is used to grip onto, i.e. to attach itself, onto a rider means during splicing as the roll of sheet material with the attached splicing tape is rotated. Once the gripping portion adheres onto a rider means, as the roll of sheet material continues to rotate, the attachment portion and the second release liner can be removed from the outer surface of the underlying winding of the roll and from the second adhesive layer, respectively. The second adhesive layer of the splicing portion is thus exposed and can be attached to the further end of the second sheet material.

The fourth adhesive layer is preferably a PSA layer, more preferably an aggressive PSA layer. Suitable PSAs for the fourth adhesive layer of the gripping portion include an adhesive of the acrylic, natural or synthetic rubber-based, silicone type or similar types, preferably a natural or synthetic rubber-based or silicone type adhesive, more preferably a natural or synthetic rubber-based adhesive. The fourth adhesive layer may have fibers dispersed therein. Preferably, the fourth adhesive layer leaves substantially no quantities of adhesive material on the rider means once the gripping portion is removed from the rider means after splicing. More preferably, the peel strength of the fourth adhesive layer to the second release liner is greater than that for the second adhesive layer of the splicing portion to the second release liner. The surface of the second release liner on the opposite side of the second adhesive layer may be treated, e.g. by corona treatment, liquid priming, chemical etching and the like, so that a strong or permanent bond is produced between the second release liner and the fourth adhesive layer. This is however not necessary for the invention. The thickness of the fourth adhesive layer may be between 2 to 100 µm.

The gripping portion may further comprise a third backing member and an additional an adhesive layer, "fifth adhesive layer", where one face of the third backing member is adjacent to the fourth adhesive layer and the fifth adhesive layer is on the opposite face of the third backing member.

The third backing member may be any suitable backing material and is not necessarily repulpable, water soluble or water dispersible as the third backing member does not become part of the final splice. The third backing member may be paper or a polymeric film or fabric. Suitable polymeric films include polyester, polypropylene, biaxially oriented polypropylene, vinyl films and the like. The thickness of the third backing member may be in the range of 30 to 250 um. The width of the third backing member may be in the range of 15 to 50 mm.

The fifth adhesive layer may be the same as the fourth adhesive layer. In case the gripping portion comprises a third backing member with the fourth and fifth adhesive layers, it is preferably that the fourth and fifth adhesive layers are different from one another. Here it is preferred that the fourth adhesive layer is an aggressive and permanent PSA towards the second release liner, while the fifth adhesive layer is an aggressive PSA, which leaves substantially no quantities of adhesive material on the rider means once the gripping portion is removed from the rider means after splicing.

Figure 7A:
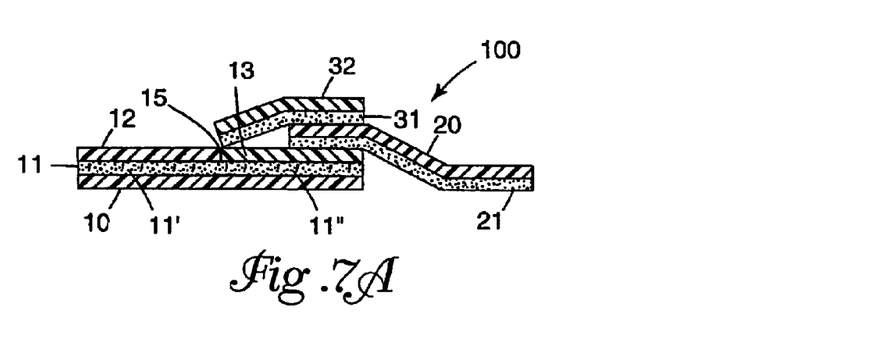
FIGS. 7A and 7B show a first embodiment of a butt splicing tape in accordance with the present invention.

FIG. 7A shows a first embodiment of a butt splicing tape according to the invention. Splicing tape 100 comprises a splicing portion including a first backing member 10 with the first and second adhesive layers 11' and 11" applied on one face to provide a continuous adhesive layer 11 over the width of first backing member 10. The splicing portion also includes an optional first release liner 12, which extends over approximately half of the width of the adhesive layer 11 on the backing 10, and a second release liner 13 located on the remaining surface of the adhesive layer 11 on the backing member 10.

An additional adhesive tape 20, 21 is applied to, i.e. connected to and distributed along the splicing portion, i.e. the free face of the second release liner 13. The additional adhesive tape comprises a second backing member 20 and, on one face of the second backing member, a third adhesive layer 21. Tape 20, 21 extends over the longitudinal edge of the second release liner 13 and provides the attachment portion of the splicing tape 100.

A fourth adhesive layer 31 is applied to, i.e. connected to and distributed along the free face of the second release liner 13 and the free face of the second backing member 20. The fourth adhesive layer 31 begins substantially at first longitudinal edge of the second release liner and extends across the width of the second release liner 13 and over the first longitudinal edge of the second backing member 20 towards the second longitudinal edge of second backing member 20, to provide the gripping portion. The fourth adhesive layer may be covered with a release liner 32.

Suitable adhesive tape 20, 21 is Correction & Cover-up brand Tape 658 or Scotch brand Masking Tape 1104 made by Minnesota Mining and Manufacturing Company, St. Paul, Minn., USA. The adhesive tape 20, 21 may be applied continuously over the length of the splicing portion or discrete lengths of the adhesive tape 20, 21 may be pre-applied intermittently, i.e. distributed along the splicing portion. The spacing for the intermittent stripes should be sufficient to maintain the splicing tape 100 in a self-supporting manner when applied to the roll. The adhesive tape 20, 21 is preferably applied continuously over the length of the splicing portion.

The fourth adhesive layer 31 may be applied continuously or in discrete portions intermittently over the length of the second release liner and attachment portion. The spacing for the intermittent portions should be sufficient to grip onto to a rider means during splicing, such that the attachment portion will be removed from the outer surface of the underlying winding of the roll and the second release liner 13 will be removed from the second adhesive layer 11" as is discussed in more detail below. The fourth adhesive layer 31 is preferably applied continuously over the length of the second release liner 13 and attachment portion. In case discrete lengths of the adhesive tape 20, 21 are applied intermittently along the splicing portion, the fourth adhesive layer 31, beginning substantially at the first longitudinal edge of the second release liner 13 as described above, should end before or at the second longitudinal edge of the second release liner 13. The fourth adhesive layer 31 may be applied in the form of a transfer tape, for example such as the transfer tape 465 available from Minnesota Mining and Manufacturing, St. Paul, Minn., USA.

The surface of the second release liner 13 on the opposite side to the second adhesive layer 11" may be treated so that a permanent or strong bond is produced between the second release liner 13 and the fourth adhesive layer 31 and/or the third adhesive layer 21. This is, however, not necessary for the invention. The surface of the second backing member 20 on the opposite side of the third adhesive layer 21 may be treated so that a permanent bond or strong is produced between the second backing member 20 and the fourth adhesive layer 31. This is, however, not necessary for the invention.

Figure 7B:
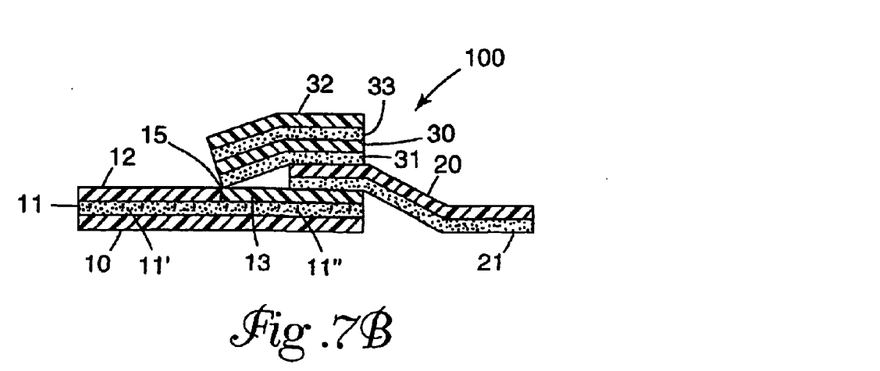

FIG. 7B shows a variation of splicing tape 100. The splicing and attachment portions are same as those for the tape according to FIG. 7A. In this embodiment a double-coated adhesive tape 30, 31, 33 is applied to, i.e. connected to and distributed along the free face of the second release liner 13 and the free face of the second backing member 20 to provide the gripping portion. The double-coated adhesive tape comprises a third backing member 30 and an adhesive layer 31, 33 on each face of the backing member, the fourth and fifth adhesive layer, respectively. The double-coated tape 30, 31, 33 extends substantially from the first longitudinal edge of the second release liner 13, across the width of the second release liner 13 and over the first longitudinal edge of the second backing member 20 towards the second longitudinal edge of second backing member 20. The fifth adhesive layer 33 may be covered with a release liner 32.

A suitable adhesive tape 30, 31, 33 is DC Tape 410 made by Minnesota Mining and Manufacturing Company, St. Paul, Minn., USA.

The double-coated adhesive tape 30, 31, 33 may be applied continuously over the length of the second release liner and attachment portion, or discrete lengths of the adhesive tape 30, 31, 33 may be pre-applied intermittently, i.e. distributed along the second release liner and attachment portion. The spacing for the intermittent strips should be sufficient to grip onto to a rider means during splicing so that the attachment portion is removed from the outer surface of the underlying winding of the roll and the second release liner 13 is removed from the second adhesive layer 11". The double-coated adhesive tape 30, 31, 33 is preferably applied continuously over the length of the second release liner and attachment portion. In case discrete lengths of the adhesive tape 20, 21 are applied intermittently along the splicing portion, the adhesive tape 30, 31, 33, extending substantially from at the first longitudinal edge of the second release liner 13 as described above, should end before or at the second longitudinal edge of the second release liner 13.

FIG. 10 schematically illustrates a preferred method of preparing and making a butt splice using an embodiment of a butt splicing tape according to the invention, butt splicing tape 100 as shown in FIG. 7B. For ease in viewing, FIG. 10 shows only the backings and liners of the butt splicing tape and the appropriate adhesive layer when it plays in role in the illustrated procedural step. FIG. 7B should be consulted for details, when following the different steps of the process outlined in FIGS. 10A to L. Splicing tape 100 is attached to the outer surface of the underlying winding 51 using the third adhesive layer 21 substantially across the width of the roll 50 (FIGS. 10A and B). The first release liner 12, if present, can then removed exposing the underlying first adhesive layer 11'. The leading edge of the sheet material 52 of the roll 50 is attached onto the first adhesive layer 11'. It can be attached in such a way that the edge of the end is close to the longitudinal edge of the second release liner 13. Alternatively a part of the sheet material may extend over the second release liner 13 (FIGS. 10C and D), which can then be torn off straight, as is usual in the paper industry, near the transition between the first and the second release liners 12, 13. At this point, the leading edge of the sheet material 52 is prepared for a splice (FIGS. 10E and F). The release liner 32 of the gripping portion, if present, can be removed to expose the underlying adhesive layer 33. The roll 50 of sheet material is then rotated. The gripping portion grips onto, i.e. adheres to, the rider means 90, whereby the attachment portion is removed from the outer surface of the underlying winding and the second release liner 13 is removed to expose the underlying second adhesive layer 11" (FIGS. 10G and H). As the roll 50 of sheet material continues to rotate, the further sheet material 58 of the second web is attached to the exposed second adhesive layer 11". The second web of sheet material may be drawn over a guide means 91. Any part of the further sheet material 58 extending over the web part 52 can then be torn off to the correct length in order to form a neat splice (FIGS. 10I and J). Sheet material 58 could be, for example, at or near the beginning of a new roll of material, to which the leading edge of sheet material 52 is to be spliced. A covering adhesive tape 3, 4 can be now simply applied over the splice thus formed to give a final permanent butt splice as shown in FIG. 3 (FIGS. 10K and L). The gripping portion together the second release liner and attachment portion can be removed from the rider means (FIG. 10I).

The application of the butt splicing tape as shown in FIG. 7A is similar to that described for the butt splicing tape as shown in FIG. 7B. The general procedural steps described above for preparing a splice or making a butt splice with splicing tape 100 as shown in FIG. 7A apply to all embodiments of the methods for preparing a splice or making a butt splice using a butt splicing tape according to the invention.

Figure 8A:
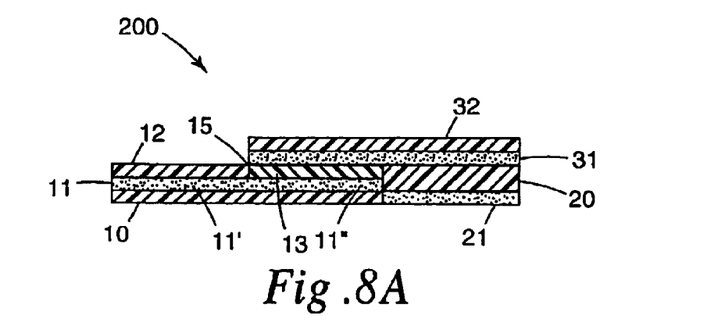
FIGS. 8A and 8B show a second embodiment of a butt splicing tape in accordance with the present invention.

FIG. 8A shows a second embodiment of a butt splicing tape according to the invention.

The splicing portion of the butt splicing tape 200 as well as the adhesive tape 20, 21 are the same as those of the butt splicing tape 100 according to FIG. 7A. In this embodiment, the adhesive tape 20, 21 is not applied to the free face of the second release liner 13, but is distributed along the longitudinal edge of the splitting portion adjacent to the second release liner 13. The adhesive tape 20, 21 is connected to the splicing portion by the fourth adhesive layer 31 of the gripping portion.

Similar to the butt splicing tape 100 as shown in FIG. 7A, the fourth adhesive layer 31 is applied to, i.e. connected to and distributed along the free face of the second release liner 13 and the free face of the second backing member 20. The fourth adhesive layer 31 begins at first longitudinal edge of the second release liner and extends across the width of the second release liner and over the first longitudinal edge of the second backing member towards the second longitudinal edge of second backing member, to provide the gripping portion. The fourth adhesive layer 31 may be covered with a release liner 32.

The adhesive tape 20, 21 may be distributed continuously or intermittently, as discrete lengths, along the splicing portion. The spacing for the intermittent strips should be sufficient to maintain the splicing tape 200 in a self-supporting manner when applied to the roll. The adhesive tape 20, 21 is preferably applied continuously along the length of the splicing portion.

The fourth adhesive layer 31 may be applied continuously or in discrete portions intermittently over the length of the second release liner and attachment portion. The spacing for the intermittent portions should be sufficient to connect the attachment portion to the splicing portion. The spacing for the intermittent portions should also be sufficient to grip onto to a rider means during splicing, such that the attachment portion will be removed from the outer surface of the underlying winding of the roll and the second release liner 13 will be removed from the second adhesive layer 11". The fourth adhesive layer 31 is preferably applied continuously over the length of the second release liner and attachment portion. In case discrete lengths of the adhesive tape 20, 21 are distributed intermittently along the splicing portion, the fourth adhesive layer 31, beginning substantially at the first longitudinal edge of the second release liner as described above, should end before or at the second longitudinal edge of the second release liner 13 in the intermediate spaces between the strips of the attachment portion. The fourth adhesive layer 31 may be applied in the form of a transfer tape, for example such as the transfer tape 465 available from Minnesota Mining and Manufacturing, St. Paul, Minn., USA.

The surface of the second release liner 13 on the opposite side to the second adhesive layer 11" may be treated so that a permanent or strong bond is produced between the second release liner 13 and the fourth adhesive layer 31. This is, however, not necessary for the invention. The surface of the second backing member 20 on the opposite side of the third adhesive layer 21 may be treated so that a permanent or strong bond is produced between the second backing member 20 and the fourth adhesive layer 31. This is, however, not necessary for the invention.

Figure 8B:
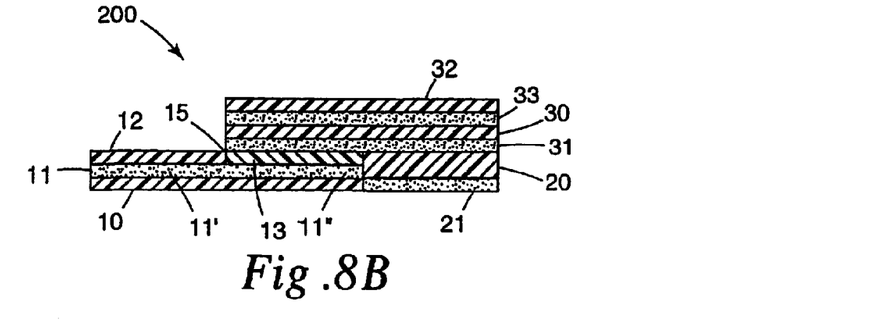

FIG. 8B shows a variation of splicing tape 200. The splicing and attachment portions are same as those for the adhesive tape according to FIG. 8A. In this embodiment, a double-coated adhesive tape 30, 31, 33 is applied to, i.e. connected to and distributed along the free face of the second release liner 13 and the free face of the second backing member 20 to provide the gripping portion. The double-coated adhesive tape is the same as that described for the butt splicing tape 100 shown in FIG. 7B.

The double-coated adhesive tape 30, 31, 33 extends substantially from the first longitudinal edge of the second release liner 13, across the width of the second release liner 13 and over the first longitudinal edge of the second backing member 20 towards the second longitudinal edge of second backing member 20. The fifth adhesive layer 33 may be covered with a release liner 32.

The double-coated adhesive tape 30, 31, 33 may be applied continuously over the length of the second release liner and attachment portion, or discrete lengths of the adhesive tape 30, 31, 33 may be pre-applied intermittently, i.e. distributed along the second, release liner 13 and the attachment portion. The spacing for the intermittent strips should be sufficient to connect the attachment portion to the splicing portion. The spacing for the intermittent strips should also be sufficient to grip onto to a rider means during splicing so that the attachment portion is removed from the outer surface of the underlying winding of the roll and the second release liner 13 is stripped from the second adhesive layer 11". The double-coated adhesive tape 30, 31, 33 is preferably applied continuously over the length of the second release liner and attachment portion. In case discrete lengths of the adhesive tape 20, 21 are applied intermittently along the splicing portion, the adhesive tape 30, 31, 33, should also be applied intermittently with the same spacing.

The butt splicing tapes 200 as shown in FIG. 8A or B show a lower profile than the butt splicing tapes 100 shown in FIG. 7A or B and may, thus, be more suitable for providing a roll of the corresponding composite tape.

The application of the butt splicing tapes as shown in FIGS. 8A and B is similar to that described for the butt splicing tape as shown in FIG. 7B.

Figure 9A:
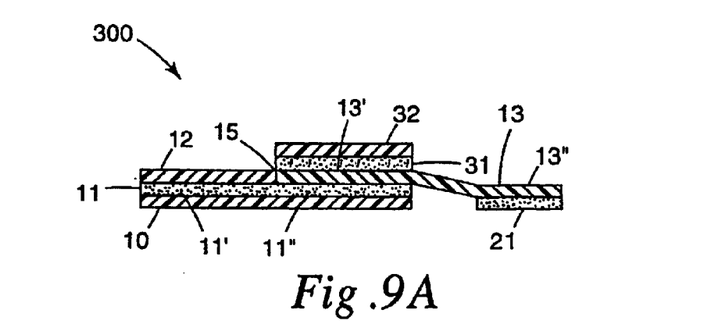
FIGS. 9A and 9B show a third embodiment of a butt splicing tape in accordance with the present invention.

FIG. 9A shows a third embodiment of a butt splicing tape according to the invention.

The splicing portion of the butt splicing tape 300 is similar to that described for butt splicing tape 100 shown in FIG. 7A, but now second release liner 13 comprises a first part 13' and a second part 13". The first part 13' covers the second adhesive layer 11". The second part 13" extends beyond the longitudinal edge of the first backing member 10 and has a third adhesive layer 21 on the face facing the second adhesive layer 11" to provide the attachment portion. The third adhesive layer 21 is applied to, i.e. connected to and distributed along said face of second release liner 13 beginning substantially at the longitudinal edge distant to backing member and extending across the width of the second release liner 13 towards the center thereof, but not beyond the longitudinal edge of the first backing member 10.

The fourth adhesive layer 31 is applied to, i.e. connected to and distributed along the free face of the second release liner 13. The fourth adhesive layer 31 begins at first longitudinal edge of the second release liner 13 and extends across the width of the second release liner 13 and towards the second longitudinal edge of second release liner 13, to provide the gripping portion. The fourth adhesive layer 31 may be covered with a release liner 32.

The third adhesive layer 21 may be applied continuously or in discrete portions intermittently over the length of the second release liner 13. The spacing for the intermittent portions should be sufficient to maintain the splicing tape 300 in a self-supporting manner when applied to the roll. The adhesive layer 21 is preferably applied continuously over the length of the second release liner.

The fourth adhesive layer 31 may be applied continuously or in discrete portions intermittently over the length of the second release liner 13. The spacing for the intermittent portions should also be sufficient to grip onto to a rider means during splicing, such that the attachment portion will be removed from the outer surface of the underlying winding of the roll and the second release liner 13 will be removed from second adhesive layer 11". The fourth adhesive layer 31 is preferably applied continuously over the length of the second release liner. The fourth adhesive layer 31 may be applied in the form of a transfer tape, for example such as the transfer tape 465 available from Minnesota Mining and Manufacturing, St. Paul, Minn., USA.

Figure 9B:
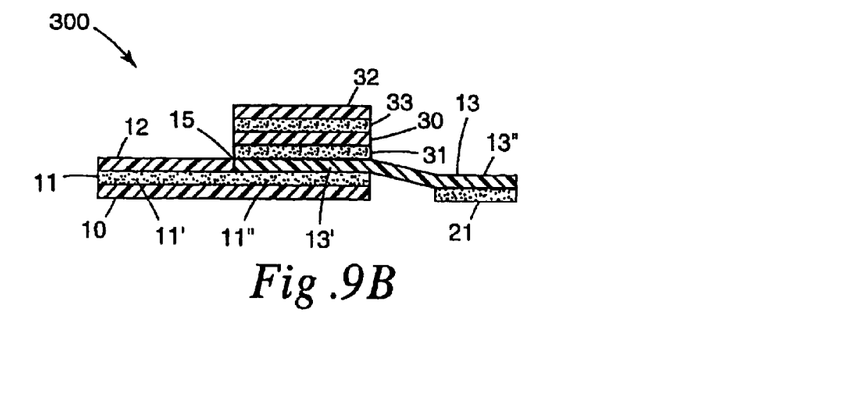
Figure 10A:
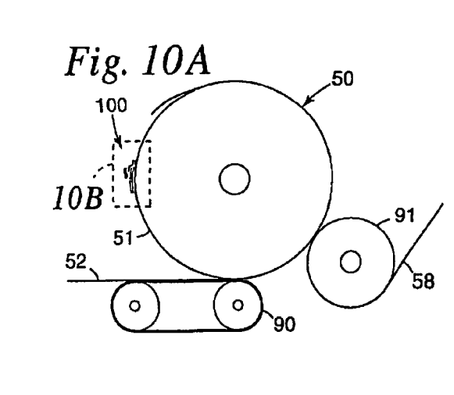
FIGS. 10A to L show the method of preparing a splice and making a butt splice using an embodiment of a butt splicing tape in accordance with the present invention.
Figure 10B:
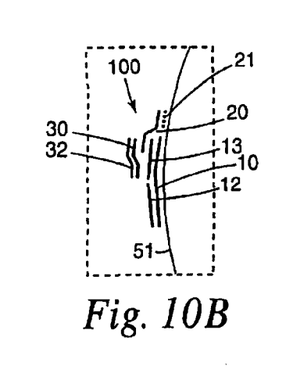
Figure 10C:
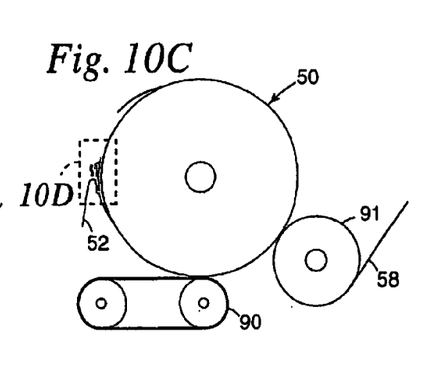
Figure 10D:
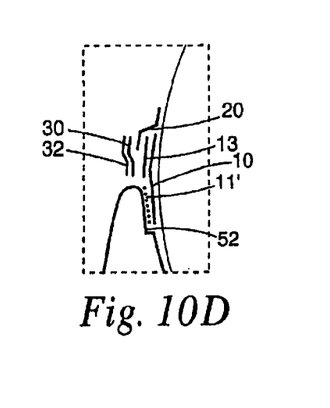
Figure 10E:
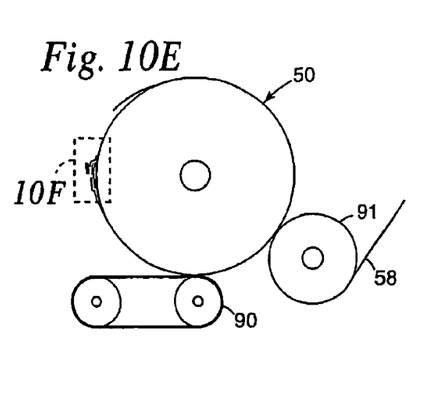
Figure 10F:
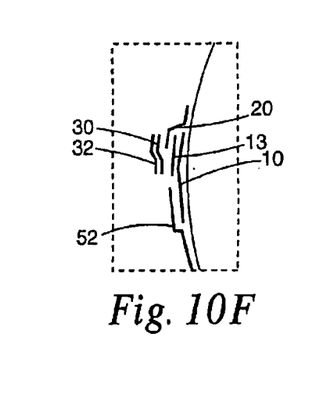
Figure 10G:
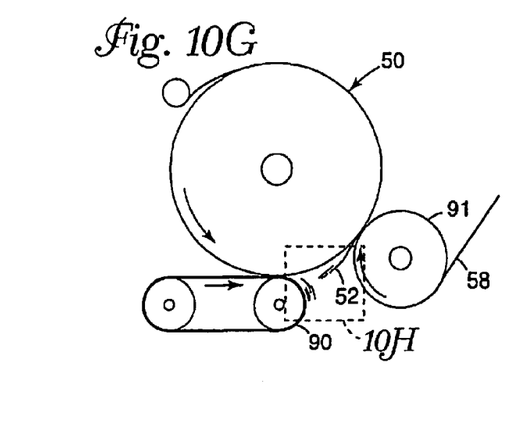
Figure 10H:
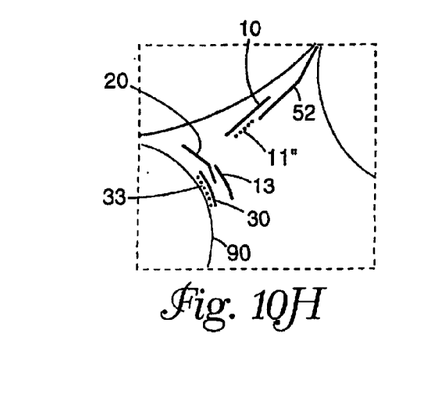
Figure 10I:
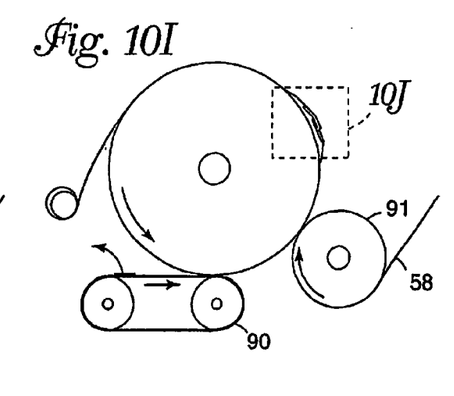
Figure 10J:
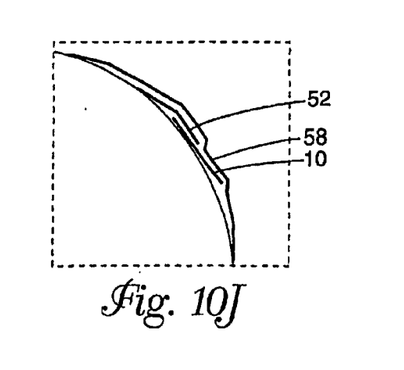
Figure 10K:
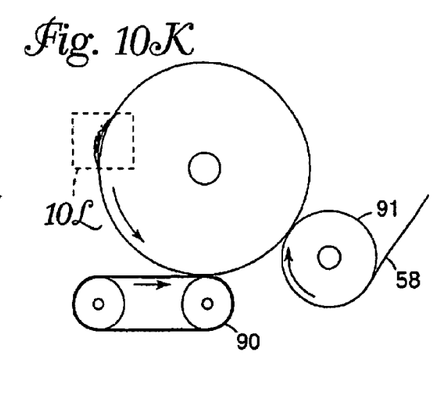
Figure 10L:
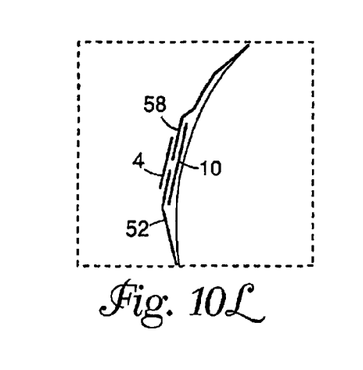
Figure 11A:
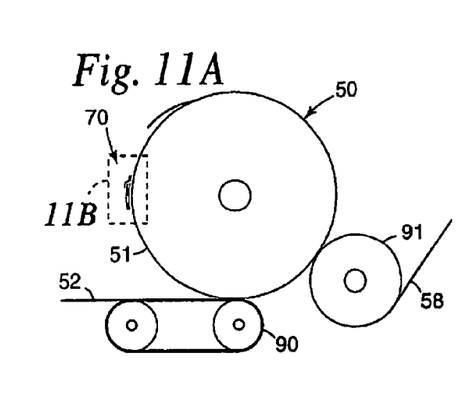
FIGS. 11A to F show the method of preparing a splice and the initial steps of making a butt splice using two separate types according to the present invention.
Figure 11B:
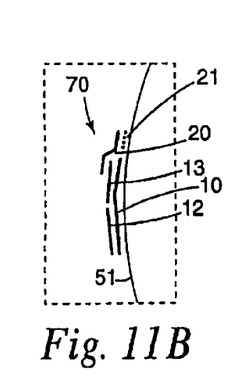
Figure 11C:
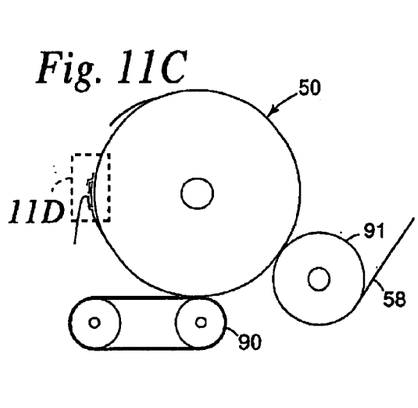
Figure 11D:
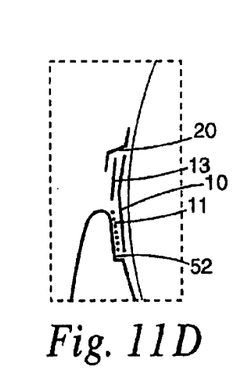
Figure 11E:
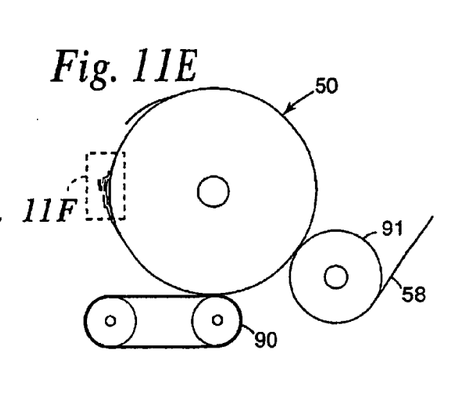
Figure 11F:
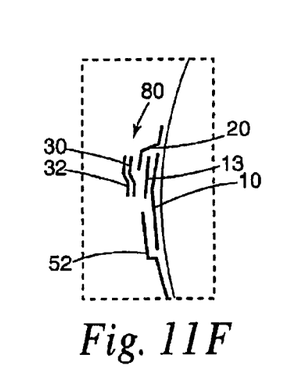

FIG. 9B shows a variation of splicing tape 300. The splicing and attachment portions are same as those for the adhesive tape according to FIG. 9A. Now a double-coated adhesive tape 30, 31, 33 is applied to, i.e. connected to and distributed along the free face of the second release liner 13 to provide the gripping portion. The double-coated adhesive tape is the same as that described for the butt splicing tape 100 shown in FIG. 7B.

The double-coated adhesive tape 30, 31, 33 extends substantially from the first longitudinal edge of the second release liner 13, across the width of the second release liner towards the second longitudinal edge of the second release liner. The fifth adhesive layer 33 may be covered with a release liner 32.

The double-coated adhesive tape 30, 31, 33 may be applied continuously over the length of the second release liner and attachment portion, or discrete lengths of the adhesive tape 30, 31, 33 may be pre-applied intermittently, i.e. distributed along the second release liner. The spacing for the intermittent strips should also be sufficient to grip onto to a rider means during splicing so that the attachment portion is removed from the outer surface of the underlying winding of the roll and the second release liner 13 is removed from the second adhesive layer 11". The double-coated adhesive tape 30, 31, 33 is preferably applied continuously over the length of the second release liner 13.

The application of the butt splicing tapes as shown in FIGS. 9A and B is similar to that described for the butt splicing tape as shown in FIG. 7B.

A further aspect of the present invention includes methods of preparing a splice and making a butt splice using two separate tapes, referred to in the following as the "two-tape methods".

One tape is a splicing tape comprising a splicing portion and an attachment portion. The materials used in and the construction of the splicing and attachment portions of splicing tapes used in the two-tape methods may be the same as those described for the splicing and attachment portions of the butt splicing tapes of the invention. The known splicing tapes as shown in FIGS. 6A and B are examples of suitable splicing tapes. The commercially available splicing tapes 9111, 9114, 9117 made by Minnesota Mining and Manufacturing Company, St. Paul, Minn., USA are further examples of suitable splicing tapes for use in the two-tape methods according to the invention.

The second tape is a double-sided adhesive tape. Double-side adhesive tapes used in the two-tape methods of the present invention may include transfer tapes and double-coated adhesive tapes. Double-coated adhesive tapes comprise a backing member and an adhesive layer on each face of said backing member. Such double-sided adhesive tapes are typically provided with a single release liner on one side of the tape, e.g. component 32 of the double-sided adhesive tapes as shown in FIGS. 2A and B. Alternatively, the adhesive tape may include two release liners, one on each side, or no release liner at all. The materials used in the double-sided adhesive tapes applied in the two-tape methods can be the same as those described for the corresponding components of the gripping portion of the butt splicing tapes of the invention. In particular, the adhesive layer of the transfer tape may be the same as the fourth adhesive layer of the gripping portion of the butt splicing tapes of the invention. For double-coated adhesive tapes, the backing member may be the same as the backing member of the gripping portion, while the two adhesive layers may be the same as the fourth and fifth adhesive layers of the gripping portion of the butt splicing tapes of the invention. The commercially available double-coated adhesive tape DC 410 and the transfer tape 465 made by Minnesota Mining and Manufacturing Company, St. Paul, Minn., USA are examples of suitable double-sided adhesive tapes for use in the two-tape method according to the invention.

FIG. 11 illustrates a preferred method of preparing a splice and the initial steps of making a butt splice using two separate tapes. In particular FIG. 11 shows the application of a splicing tape 70 as shown in FIG. 6B and a double-coated adhesive tape 80 with an optional release liner as shown in FIG. 2A. For ease in viewing, FIG. 11 shows only the backings and liners of the tapes and the appropriate adhesive layer when it plays in role in the illustrated procedural step. FIG. 6B and FIG. 2A should be consulted for details, when following the different steps of the process outlined in FIG. 11A to F. Splicing tape 70 is attached to the outer surface of the underlying winding 51 using the third adhesive layer 21 substantially across the width of the roll (FIGS. 11A and B). Release liner 12, if present, can then be removed exposing the underlying adhesive layer 11. The leading edge of the sheet material 52 is attached onto said adhesive layer. It can be attached in such a way that the edge of the end is close to the longitudinal edge of the second release liner 13. Alternatively, a part of the sheet material may extend over the second release liner 13, which can then be torn off straight, as is usual in the paper industry, near the transition between the first and second release liners 12,13 (FIGS. 11C and D). The double-coated adhesive tape 80 is attached to the splicing tape, such that one side of the double-sided adhesive tape is connected to and substantially distributed along the second release liner of the splicing tape extending across the width of second release liner from substantially the first longitudinal edge of the second release liner and extending towards second longitudinal edge of the second release liner. At this point, the leading edge of sheet material is prepared for a splice (FIGS. 11E and F).

The general procedural steps described above apply to all embodiments of the two tape methods according to the invention.

An shown in FIG. 11, the attachment of the double-sided adhesive tape may be performed, such that one side of said double-sided adhesive tape is connected to and substantially distributed along both the second release liner and attachment portion beginning substantially at the first longitudinal edge of the second release liner and extending towards said attachment portion of said splicing tape.

In alternative methods, the double-sided adhesive tape can be attached to the splicing tape before the leading edge has been attached to the first adhesive layer of the splicing tape or before the splicing tape is attached to the outer surface of the underlying winding.

Once the splice has been prepared, the remaining procedural steps for making the butt splice are the similar as those described above for the method of making a butt splice using a butt splicing tape of the invention and shown in FIG. 10G to L.

The release liner from the second side of the double-sided adhesive, if present, can be removed to expose the underlying adhesive layer. The roll of sheet material is then rotated. The double-sided adhesive tape grips onto, i.e. adheres to, the rider means, whereby the attachment portion is removed from the outer surface of the underlying winding and the second release liner is removed to expose the underlying second adhesive layer. As the roll of sheet material continues to rotate, the further sheet material is attached to the exposed second adhesive layer. Any part of the further sheet material extending over the web part can then be torn off to the correct length in order to form a neat splice. A covering adhesive tape can be now simply applied over the splice thus formed to give a final permanent butt splice as shown in FIG. 3. The double-sided adhesive tape together the second release liner and attachment portion can be removed from the rider means.

As mentioned above, the butt splicing tapes of the invention and the methods of preparing a splice and making a butt splice according to the invention find particular use for splicing on a winder or rewinder having a rider means. During splicing on conventional winders and rewinders, upon rotation of the roll of sheet material with the attached splicing tape, said tape typically passes over one single rider means before attachment of the further end of the second sheet material. In case due to the particular construction of the winder/rewinder, said tape will pass over two rider means before attachment of the further end of the second sheet material, the butt splicing tapes and the prepared splices according to the invention may further comprise a second gripping portion. Here the outermost adhesive layer of the first gripping portion is covered with a release liner, "third release liner" and the second gripping portion comprising an adhesive layer is connected to and distributed along the third release liner of the first gripping portion. The second gripping portion is used to grip onto, i.e. to attach itself onto, the first rider means during splicing as the roll of sheet material with the attached splicing tape is rotated. Once the second gripping portion adheres onto the first rider means, as the roll of sheet material continues to rotate, the third release liner of the first gripping portion can be removed to expose the outermost adhesive layer of the first gripping portion. Upon further rotation, the first gripping portion can grip onto, i.e. attach itself onto, the second rider means, and the attachment portion and the second release liner can be then removed from the outer surface of the underlying winding of the roll and from the second adhesive layer, respectively. The second adhesive layer of the splicing portion is thus exposed and can be attached to the further end of the second sheet material. Similar to the first gripping portion the second gripping portion may further comprise a backing member and an additional adhesive layer, where one face of said backing member is adjacent to the one adhesive layer and the additional adhesive layer is on the opposite face of said backing member. The materials used in the second gripping portion may be the same as the corresponding components of the first gripping portion. The outermost adhesive layer of the second gripping portion may optionally be covered by a release liner, which would be removed prior to making the splice, in particular rotating the roll of sheet material with the attached splicing tape. The material of the release liner may be similar to those described with respect to the release liners of the splicing portion.

The second gripping portion may be provided during the process of preparing a splice or making a butt splice using a butt splicing tape of the invention by attaching a double-sided adhesive tape to the butt splicing tape, such that one side is connected to and substantially distributed along the third release liner of gripping portion. Such a step may be performed after the step of attaching the leading edge to the first adhesive layer. The double-sided adhesive tape applied here may be the same as those described for use in the two-tape methods of the invention.

The methods of preparing a splice and making a butt splice according to the two-tape methods of the invention may also further comprise a similar procedural step. For example, after step (iii), e.g. attaching one side the double-sided adhesive tape to the splicing tape, a further step of attaching a second double-sided adhesive tape to the splicing tape can be performed, such that one side of the second double-sided adhesive tape is connected to and substantially distributed along the release liner of the first double-sided adhesive tape.

What is claimed is:

1. A butt splicing tape comprising:
    a splicing portion, an attachment portion and a gripping portion, wherein said splicing portion comprises
    an elongated first backing member having two faces and two longitudinal edges,
        a first adhesive layer on the first face of said first backing member, said first adhesive layer extending across the width of said first backing member substantially along the first longitudinal edge of said first backing member and optionally being covered by a first release liner, and
        a second adhesive layer on the first face of said first backing member, said second adhesive layer extending across the width of said first backing member substantially along the second longitudinal edge of said first backing member and being covered by a second release liner having two faces and two longitudinal edges, the first face of said second release liner being adjacent to second adhesive layer and the second face is a free face;
    wherein said attachment portion is applied to the free face of the second release liner of the splicing portion, said attachment portion including a third adhesive layer; and
    wherein said gripping portion includes a fourth adhesive layer applied to the free face of said second release liner of splicing portion and to said attachment portion.

2. A butt splicing tape according to claim 1, wherein said attachment portion further comprises a second backing member having two faces and two longitudinal edges and said third adhesive layer is on the first face of said second backing member; and wherein said fourth adhesive layer is on the second face of said second release liner and the second face of said second backing member beginning substantially at first longitudinal edge of said second release liner and extending across the width of said second release liner and over the first longitudinal edge of said second backing member towards the second longitudinal edge of said second backing member.

3. A butt splicing tape according to claim 1, wherein said second release liner extends beyond the second longitudinal edge of said first backing member and said third adhesive layer is applied on the first face of second release liner beginning substantially at said second longitudinal edge of second release liner and extending across the width of said second release liner towards the center thereof, but not beyond said second longitudinal edge of said first backing member; and wherein said fourth adhesive layer is on the second face of said second release liner beginning substantially at first longitudinal edge of said second release liner and extending across the width of said second release liner towards the second longitudinal edge of said second release liner.

4. A butt splicing tape of claim 1, wherein said gripping portion further comprises a third backing member having two faces and a fifth adhesive layer, wherein the first face of said third backing member is on said fourth adhesive layer and said fifth adhesive layer is on the second face of said third backing member.

5. A prepared splice on the leading edge of a roll of sheet material, each winding of said sheet material on said roll having an outer surface facing radially outwards from said roll and said roll having an underlying winding, comprising:
    a splicing portion, an attachment portion and a gripping portion,
    wherein said splicing portion comprises
        an elongated first backing member having two faces and two longitudinal edges,
        a first adhesive layer on the first face of said first backing member attaching the leading edge of the roll substantially across the width of said roll to said first backing member, said first adhesive layer extending across the width of said first backing member substantially along the first longitudinal edge, and a second adhesive layer on the first face of said first backing member, said second adhesive layer extending across the width of said first backing member substantially along the second longitudinal edge of said first backing member and being covered by a second release liner having two faces and two longitudinal edges, the first face of said second release liner being adjacent to second adhesive layer and the second face is a free face;

wherein said attachment portion is attached to said splicing portion and releasably and self-supportively attaching said splice to the outer surface of the underlying winding of said roll substantially across the width of said roll, said attachment portion including a third adhesive layer; and wherein said gripping portion includes a fourth adhesive layer applied to the free face of said second release liner and to said attachment portion.

6. A method for preparing a splice on the leading edge of a roll of sheet material using a butt splicing tape of claim 1, winding of said sheet material on said roll having an outer surface facing radially outwards away from said roll and said roll having an underlying winding, said method comprising the following steps:

attaching said splicing tape to the outer surface of said underlying winding using the third adhesive layer substantially across the width of the said roll; and attaching said leading edge to the first adhesive layer.

7. A method for making a butt splice on winder or rewinder having a rider means between the leading edge of a roll of sheet material and a further sheet material using a butt splicing tape of claim 1, winding of said sheet material on said roll having an outer surface facing radially outwards away from said roll and said roll having an underlying winding, said method comprising the following steps:

attaching said splicing tape to the outer surface of said underlying winding using the third adhesive layer substantially across the width of the said roll;

attaching the said leading edge to the first adhesive layer; and rotating said roll of sheet material, so that the gripping portion grips onto the rider means, whereby the attachment portion is removed from the outer surface of the underlying winding and the second release liner is removed to expose the second adhesive layer, and so that the further sheet material is attached to the exposed second adhesive layer.

8. A method for preparing a splice on the leading edge of a roll of sheet material using a splicing tape and a double-sided adhesive tape, each winding of said sheet material on said roll having an outer surface facing radially outwards away from said roll and said roll having an underlying winding, said splicing tape comprising a splicing portion and an attachment portion, wherein said splicing portion comprises an elongated backing member having two faces and two longitudinal edges, a first adhesive layer on the first face of said backing member, said first adhesive layer extending across the width of said backing member substantially along the first longitudinal edge of said backing member and optionally being covered by a first release liner, and a second adhesive layer on the first face of said backing member, said second adhesive layer extending across the width of said backing member substantially along the second longitudinal edge of said backing member and being covered by a second release liner having two faces and two longitudinal edges, the first face of said second release liner being adjacent to second adhesive layer and the second face is afree face; and wherein said attachment portion is connected to and distributed substantially along said splicing portion, said attachment portion including a third adhesive layer, said method comprising the following steps:
(i) attaching said splicing tape to the outer surface of the underlying winding using said third adhesive layer substantially across the width of the roll;
(ii) attaching said leading edge to the first adhesive layer; and
(iii) attaching said double-sided adhesive tape to said splicing tape such that one side of said double-sided adhesive tape is applied to the free face of said second release liner of said splicing tape extending across the width of second release liner from substantially the first longitudinal edge of the second release liner and extending towards second longitudinal edge of the second release liner; the second side of said double-sided adhesive tape is optionally covered with a release liner.

9. A method for preparing a splice according to claim 8, wherein step (iii) is performed prior to step (i).

10. A method for preparing a splice according to claim 8, wherein step (iii) is performed prior to step (ii).

11. A method for preparing a splice of claim 8, wherein step (iii) is performed, such that said double-sided adhesive tape is applied to both said second release liner and attachment portion of said splicing tape, said double-sided adhesive tape extending across the width of second release liner from substantially the first longitudinal edge of the second release liner and towards said attachment portion.

12. A method for making a butt splice on a winder or rewinder having a rider means between the leading edge of a roll of sheet material and a further sheet material using a splicing tape and a double-sided adhesive tape, each winding of said sheet material on said roll having an outer surface facing radially outwards away from said roll and said roll having an underlying winding, said splicing tape comprising a splicing portion and an attachment portion, wherein said splicing portion comprises an elongated backing member having two faces and two longitudinal edges, a first adhesive layer on the first face of said backing member, said first adhesive layer extending across the width of said backing member substantially along the first longitudinal edge of said backing member and optionally being covered by a first release liner, and a second adhesive layer on the first face of said backing member, said second adhesive layer extending across the width of said backing member substantially along the second longitudinal edge of said backing member and being covered by a second release liner having two faces and two longitudinal edges, the first face of said second release liner being adjacent to second adhesive layer and the second face is a free face; and wherein said attachment portion is applied to said splicing portion, said attachment portion including a third adhesive layer, said method comprising the following steps:
- (i) attaching said splicing tape to the outer surface of the underlying winding using said third adhesive layer substantially across the width of the roll;
- (ii) attaching said leading edge to the first adhesive layer;
- (iii) attaching said double-sided adhesive tape to said splicing tape such that one side of said double-sided adhesive tape is applied to said second release liner of said splicing tape extending across the width of second release liner from substantially the first longitudinal edge of the second release liner and extending towards second longitudinal edge of the second release liner; the second side of said double-sided adhesive tape is optionally covered with a release liner;
- (iv) removing the release liner from the second side of the double-sided adhesive tape, if present, to expose the underlying adhesive layer; and
- (v) rotating said roll of sheet material, so that the double-sided adhesive tape grips onto the rider means, whereby the attachment portion of said splicing tape is removed from the outer surface of the underlying winding and the second release liner is removed to expose the second adhesive layer, and so that the further sheet material is attached to the exposed second adhesive layer.

13. A method for making a butt splice according to claim 12, wherein step (iii) is performed prior to step (i).

14. A method for making a butt splice according to claim 12, wherein step (iii) is performed prior to step (ii).

15. A method for making a butt splice of claim 12, wherein step (iii) is performed, such that said double-sided adhesive tape is connected to and substantially distributed along both said second release liner and said attachment portion of said splicing tape, said double-sided adhesive tape extending across the width of second release liner from substantially the first longitudinal edge of the second release liner and towards said attachment portion.

16. A butt splicing tape of claim 1, wherein said gripping portion further comprises a third backing member having two faces and a fifth adhesive layer, wherein the first face of said third backing member is on said fourth adhesive layer and said fifth adhesive layer is on the second face of said third backing member.

17. A butt splicing tape of claim 2, wherein said gripping portion further comprises a third backing member having two faces and a fifth adhesive layer, wherein the first face of said third backing member is on said fourth adhesive layer and said fifth adhesive layer is on the second face of said third backing member.

18. A butt splicing tape of claim 3, wherein said gripping portion ftuther comprises a third backing member having two faces and a fifih adhesive layer, wherein the first face of said third backing member ison said fourth adhesive layer and said fifth adhesive layer is on the second face of said third backing member.

* * * * *

UNITED STATES PATENT AND TRADEMARK OFFICE
CERTIFICATE OF CORRECTION

PATENT NO. : 6,951,676 B2
APPLICATION NO. : 10/381167
DATED : October 4, 2005
INVENTOR(S) : Shaw, Robert G.

It is certified that error appears in the above-identified patent and that said Letters Patent is hereby corrected as shown below:

Column 7
Line 7, Delete "adhdesive" and insert -- adhesive -- therefor.
Line 48, After "second" delete ",".

Column 12
Line 6, After "transition" insert -- 15 --.

Column 13
Line 54, After "second" delete ",".

Column 16
Line 10, Delete "tom off" and insert -- torn off -- therefor.

Column 19
Line 20, In Claim 6, after "using" delete "a" and insert -- the -- therefor.
Line 32, In Claim 7, after "using" delete "a" and insert -- the -- therefor.

Column 20
Line 7, In Claim 8, delete "afree" and insert -- a free -- therefor.

Column 22
Line 23, In Claim 18, delete "ftuther" and insert -- further -- therefor.
Line 24, In Claim 18, delete "fifih" and insert -- fifth -- therefor.
Line 25, In Claim 18, delete "ison" and insert -- is on -- therefor.

Signed and Sealed this

Eleventh Day of July, 2006

JON W. DUDAS
*Director of the United States Patent and Trademark Office*